Patented Aug. 15, 1944

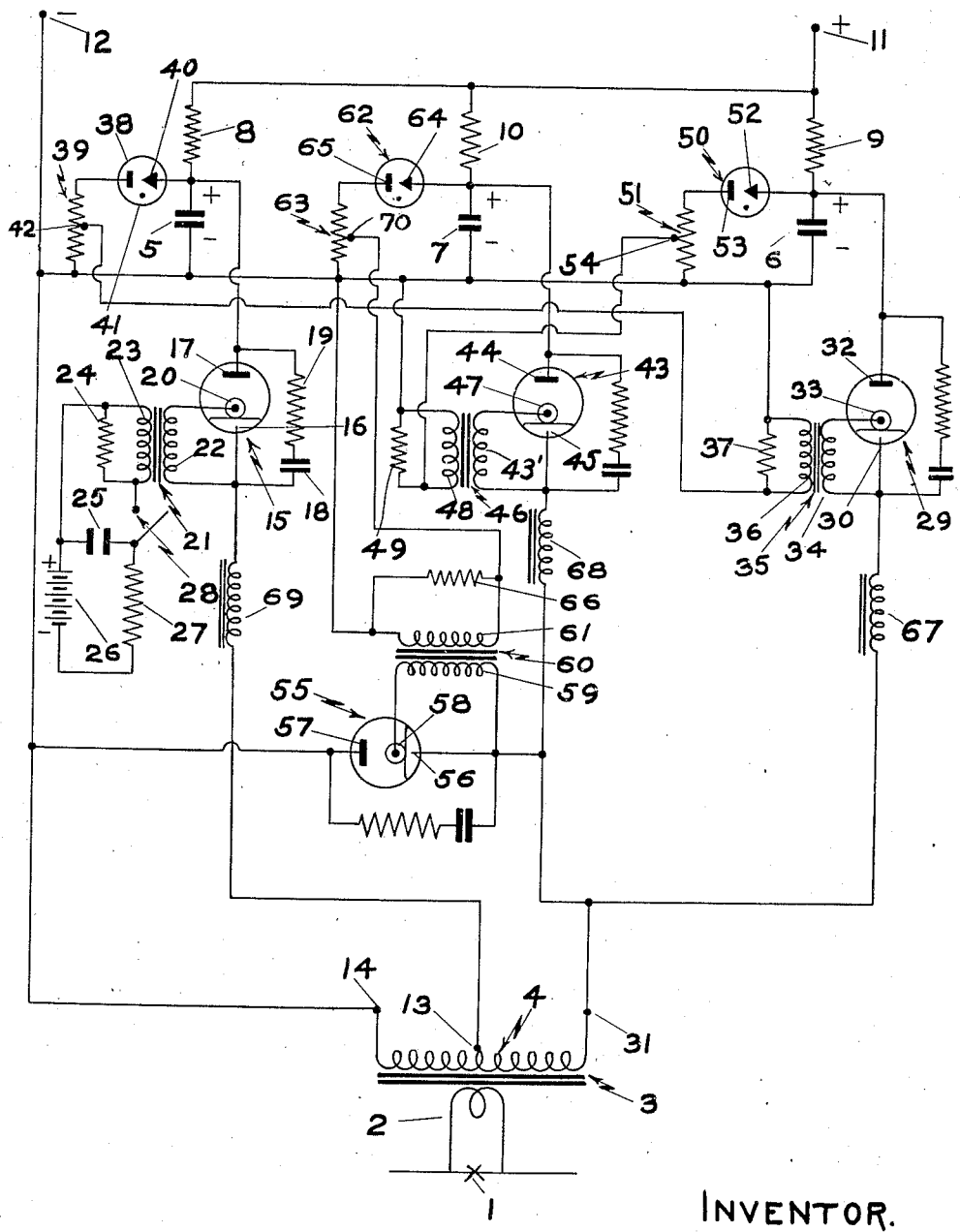

2,355,633

UNITED STATES PATENT OFFICE 2,355,633

ELECTRICAL CONTROL SYSTEM

John W. Dawson, West Newton, Mass., assignor to Raytheon Manufacturing Company, Newton, Mass., a corporation of Delaware Application March 25, 1942, Serial No. 436,162

15 Claims. (Cl. 171—119)

This invention relates to electrical systems of the type in which gaseous electrical space discharge devices are employed in establishing current supply circuits. More particularly this invention relates to systems of said type in which such circuits are adapted to supply successive pulses of current to a suitable impedance. This invention is particularly valuable in welding systems of the type mentioned.

In certain systems of the type described, such as for example, that system described in the copending application of Hans Klemperer, Serial Number 316,798, filed February 1, 1940, for Condenser welding systems, a plurality of circuits are provided. Each of said circuits are designed to supply successive pulses of current to an impedance, such as for example a welding transformer. These pulses are arranged to overlap, a second pulse being supplied before a previously supplied pulse has completely decayed. In such systems, the establishment of a circuit is produced by the ignition of a gaseous rectifying tube. During the time said tube is conducting current, substantial ionization occurs therein. If, while said tube is conducting current, a second circuit is established, supplying another pulse of current to the same impedance and in the same direction, an inverse voltage will be applied to said tube. The application of this inverse voltage to said tube at the time it is conducting current and is substantially ionized will tend to instantly extinguish said tube before deionization of the gas therein can occur and will cause the ions in said tube to be hurled at the anode. Certain harmful effects will be thereby produced. For example, sputtering of the anode will occur with possible injury to the igniter of said tube because of the sputtering of anode material thereof. In extreme cases flashback may occur.

An object of this invention is the provision of means in such a system for preventing the aforesaid harmful effects.

Another object of this invention is the provision of means for delaying the application of the inverse voltage to the gaseous rectifying tube in such system until the current passing through said tube has decayed.

A further object of this invention is the provision of means for gradually reducing the current passing through a gaseous rectifying tube in such system to thereby permit substantial deionization before the inverse voltage is applied thereto.

Other and further objects of the present invention will become apparent and the foregoing will be best understood from the following description of an exemplification thereof, reference being had to the drawing in which the figure is a schematic representation of an electrical system embodying my invention.

In the arrangement shown in the figure, welding current is to be supplied to a resistance welding load 1 from the secondary winding 2 of a welding transformer 3 provided with a primary winding 4. Current is supplied to the primary winding 4 from a plurality of condensers 5, 6 and 7. These condensers are adapted to be charged from any suitable source of direct current (not shown), such as a direct current generator, battery, rectifier or the like. In the figure the condensers 5, 6 and 7 have their positive sides connected through suitable limiting impedances 8, 9 and 10, respectively, to output terminal 11. The negative sides of said condensers are connected together and to output terminal 12. Terminals 11 and 12 are connected to a suitable source of direct current; terminal 11 being connected to the positive side of said source and terminal 12 being connected to the negative side of said source. The value of impedances 8, 9 and 10 is chosen so as to provide for the charging of condensers 5, 6 and 7, respectively, at their proper charging rate. These impedances may be resistances, or, if high efficiency is desired, may be inductances.

The primary winding 4 of the welding transformer 3 is provided with a tap 13 intermediate the ends thereof. Condenser 5 is adapted to be discharged through the left side of said primary as viewed in the drawing, said left side being the portion of the primary between tap 13 and end 14 of said primary. For this purpose the negative side of condenser 5 is connected directly to end 14 of the primary. The positive side of condenser 5 is connected to tap 13 of the primary through a gaseous controlled ignition discharge rectifying tube 15. The tube 15 is preferably of the pool cathode type with an igniter for initiating an arc spot on the pool to fire said tube. An electrostatic type of igniter, which consists of a conductor separated and insulated from the cathode pool by a thin glass layer, is preferably employed. Tube 15 is provided with a pool cathode 16 connected to tap 13. Tube 15 is also provided with an anode 17 connected directly to the positive side of the condenser 5. In order to assist tube 15 in starting a condenser 18 in series with a resistance 19 is arranged in shunt across tube 15. Igniter 20, preferably of the type described above, is provided for the cathode 16.

For igniting tube 15 an igniting transformer 21 is provided having the ends of its secondary 22 connected to igniter 20 and cathode 16, respectively. The primary winding 23 has a resistance 24 arranged across it. Primary winding 23 is adapted to be supplied with a pulse of current from a condenser 25 which may be by a suitable source of direct current such as a battery 26 in series with a current limiting resistance 27. A switch 28 is provided to connect the condenser 25 to the primary winding 23.

Following the discharge of condenser 5, the condenser 6 is next adapted to be discharged through the primary winding 4 of the welding transformer 3. This discharge is adapted to take place through the entire primary winding 4. For this purpose a tube 29, preferably of the same type as tube 15, is connected between condenser 6 and winding 4. The tube 29 is provided with a pool cathode 30 and is also provided with an anode 32 connected to the positive side of the condenser 6. An igniter 33 preferably of the same type as that described in connection with tube 15 is provided. Igniting impulses are supplied to said igniter by the secondary 34 of an igniting transformer 35 having a primary 36 with a resistance 37 arranged across said primary. Tube 29 is adapted to be fired after tube 15 has been fired and while said tube is still conducting current. When tube 15 is fired condenser 5 is discharged and during the discharge of condenser 5 the voltage across it falls to zero when substantially maximum discharge current is flowing from said condenser. Thereupon the potential across said condenser and across the left side of primary winding 4 tends to reverse due to the inductance of the associated circuit, while the current tends to continue to flow in the original direction. At the time of the reversal of the potential across condenser 5, a substantial amount of current is passing through tube 15 and the left side of the primary winding 4. It is at this time that tube 29 is arranged to be fired to provide an additional pulse of current to the primary winding.

In order to fire tube 29 at this time, I prefer to arrange a rectifier tube 38 in series with a resistance 39 across condenser 5. This control tube 38 is preferably of the gaseous rectifier type having a permanently energized cathode 40 connected to the positive side of condenser 5 and an anode 41 connected in series with a resistance 39 to the negative side of condenser 5. When the potential on condenser 5 reverses tube 38 will conduct and thereby a drop in potential will be produced across resistance 39. This drop in potential is utilized to supply an igniting impulse to the primary 36 of the igniting transformer 35 and thereby to igniting tube 29. For this purpose one end of the primary 36 is connected to the negative side of condenser 5 and the other end of primary 36 is connected to a tap 42 on resistance 39.

It will therefore be seen that, when the potential across condenser 5 reverses, tube 29 will be ignited and thereby establish a circuit for discharging condenser 6 through the primary winding 4 of the welding transformer. This discharge of condenser 6, occurring at the time when tube 15 is still conducting current and therefore has a highly ionized atmosphere therein, produces an inverse potential across said tube 15, rapidly extinguishing tube 15 before the atmosphere in said tube is substantially deionized and tending to hurl the ions in said tube against the anode. Means are provided, as will be hereinafter described, for preventing this deleterious effect.

The discharge of condenser 6 causes the voltage across it to fall to zero when substantially maximum discharge current is flowing from said condenser. Thereupon the potential across the primary winding tends to reverse due to the inductance of the associated circuit, while the current tends to flow in the original direction. While current from condenser 6 is still being supplied to the primary winding 4 condenser 7 is adapted to be discharged into said primary to provide a subsequent pulse of current overlapping the pulse of current supplied by condenser 6. For discharging condenser 7 a gaseous ignition controlled discharge tube 43, similar to tubes 15 and 29 is provided. Tube 43 has its anode 44 connected to the positive side of condenser 7 and its cathode 45 connected to end 31 of the primary winding 4. Upon ignition of tube 43 condenser 7 will discharge through the primary winding 4. For igniting tube 43 an igniting transformer 46 is provided having its secondary 43' connected to cathode 45 of tube 43 and to igniter 47. The primary 48 of igniting transformer 46 has a resistance 49 connected across it. Tube 43 is adapted to be fired to discharge condenser 7 when condenser 6 is supplying a substantial amount of current to the primary winding 4 and when the potential across condenser 6 and across primary winding 4 has reversed. For this purpose I prefer to arrange a rectifying tube 50 similar to rectifying tube 40 in series with a resistance 51 across condenser 6. Tube 50 has its cathode 52 connected to the positive side of condenser 6 and its anode 53 connected in series with resistance 51 to the negative side of condenser 6. Upon reversal of the potential across condenser 6, tube 50 conducts current thereby establishing a drop of potential across resistance 51. This drop of potential is employed to provide an igniting impulse to the primary 48 of igniting transformer 46 to thereby ignite tube 43. For this purpose the primary 48 has one end thereof connected to the negative side of condenser 6 and the other end thereof connected to tap 54 on resistance 51.

Upon the firing of tube 43 an inverse potential is applied to the tube 29 at the moment when tube 29 is still conducting and the atmosphere thereof is substantially ionized. The inverse potential tends to immediately extinguish tube 29 and to cause the ions therein to be hurled against the anode 32 of said tube. Means for preventing this will also be described hereinafter.

In order to make the complete welding current impulse decay exponentially, said complete welding current consisting of the conjoined impulses successively supplied by condensers 5, 6 and 7, an ignition discharge tube 55, preferably of the same type as tubes 15, 29 and 43, is arranged in shunt across primary 4. Tube 55 has its cathode 56 connected to end 31 of the primary winding 4 and its anode 57 connected to end 14 of primary winding 4. It will be seen that, when the last condenser 7 of the series discharges, the potential on cathode 56 will be positive and on the anode 57 will be negative immediately upon the firing of tube 43. This potential will decline until it is ready to reverse at the time maximum current is flowing from condenser 7. Upon the reversal of potential as the current begins to decay a positive potential will be applied to anode 57 of tube 55 and a negative potential to cathode 56 of said tube. Tube 55 is then ready to conduct and will conduct upon the application thereto of a suitable igniting impulse. For igniting tube 55 an igniting electrode 58 similar to the igniting electrode heretofore described in connection with tube 15 may be provided. Igniting electrode 58 is connected to one end of the secondary 59 of an igniting transformer 60, the other end of secondary 59 being connected to the cathode 56. For supplying a pulse of current to the primary 61 of the igniting transformer 60, I prefer to make use of the reversing of potential across condenser 7. In order to derive a potential from said condenser, I prefer to provide a gaseous rectifying tube 62, preferably of the same type as tube 50, arranged in series with a resistance 63 across condenser 7. Tube 62 has its permanently energized cathode 64 connected to the positive side of condenser 7 and its anode 65 connected to the negative side of condenser 7 through series resistance 63. It will be seen that when the potential across condenser 7 reverses tube 62 will conduct and a fall of potential will be produced across resistance 63. This fall of potential is used to supply an igniting impulse to the primary 61 by connecting one end of said primary to the side of said resistance connected to the negative side of condenser 7 and the other end of said primary to a tap 70 on said resistance 63 intermediate the ends of said resistance. A resistance 66 may also be provided across the primary 61.

The following is the operation of the system herein described. Upon closing of switch 28 condenser 25 discharges into the primary 23 of the igniting transformer 21 thereby igniting tube 15. Condenser 5 thereupon discharges through the left side of the primary winding 4. This discharge of condenser 5 causes the voltage across it to fall to zero when the substantially maximum discharge current is flowing from said condenser. Thereupon the potential across the left side of the primary winding 4 tends to reverse due to the inductance of the associated circuit and the current tends to flow in the same direction. Upon the reversal of the potential across condenser 5 tube 38 will begin to conduct and thereby supply an igniting impulse to tube 29. Tube 29 will thereupon fire.

At the moment of firing of tube 29, tube 15, which is conducting current but slightly less than the maximum current produced during the discharge of condenser 5, has its gaseous atmosphere substantially ionized. At this moment the potential across said tube is relatively slight. The firing of tube 29 at this instant tends to apply a substantially greater inverse voltage to tube 15 for tap 13 instantly rises to a high positive potential relative to end 14 of primary winding 4 due to the discharge of condenser 6. This inverse potential, applied while tube 15 is conducting current, extinguishes said tube 15 before it has had an opportunity to become deionized and tends to hurl the ions in said tube towards the anode 17 thereby causing injury to said anode and sputtering of the anode material, and in extreme cases, flashback. A similar situation appears in the subsequent operation of this system when after tube 29 has been ignited and the potential across condenser 6 has reversed, as described hereinbefore in connection with condenser 5, tube 43 is ignited and condenser 7 discharges, tending to apply a similar inverse voltage to tube 29. These deleterious effects may be avoided by providing means for retarding the application of any substantial portion of the inverse voltage to the ionized tube and by permitting said inverse voltage to be gradually applied, thereby allowing the current through said ionized tube to decay gradually and allowing said tube to become substantially deionized before a substantial portion of the inverse voltage is applied thereto. Another way of preventing these deleterious effects is to provide means for gradually reducing the current passing through said ionized tube, to thereby produce substantial deionization in said tube before any substantial portion of the inverse voltage is applied thereto.

In retarding the application of the inverse voltage to tube 15, which voltage is derived from condenser 6 by the firing of tube 29, I prefer to interpose a choke coil 67 in series with tube 29 by connecting one end of said choke coil to the cathode 30 of tube 29 and the other end thereof to end 31 of the primary winding 4. It will be seen that when tube 29 is fired, the presence of choke coil 67 will prevent the potential appearing on the cathode 30 of tube 29 from instantly appearing at end 31 of primary winding 4. However, as current starts to flow through said coil, the voltage drop across said coil will decrease and the potential at end 31 of primary winding will rise gradually. This potential is impressed through tap 13 inversely on tube 15. Tube 15 is extinguished, but the inverse voltage is applied so gradually to said tube that substantially complete deionization occurs before the applied potential reaches a substantial value. The value of choke coil 67 is chosen to produce this function. In order to obtain maximum efficiency, I prefer that choke coil 67 be a saturable reactor designed to saturate at currents substantially lower than the maximum currents adapted to flow in the circuit associated with said choke coil. Thus, while choke coil 67 offers a substantial impedance upon the rise of current passing therethrough, it will saturate at a comparatively low value of said current and thereafter offer substantially no impedance to the further rise or flow of current.

In order to retard the application of the inverse potential produced by the firing of tube 43, which inverse potential tends to be applied to tube 29, a similar saturable reactor 68 may be arranged in series in the circuit associated with tube 43 by interposing said reactor 68 between end 31 of the primary winding 4 and cathode 45 of tube 43.

In addition to the means just described for preventing the harmful effects due to application of inverse potential to tubes which are substantially ionized, other means may be provided for preventing said effects. Said other means is adapted to compel gradual reduction of the current in the ionized tube, thereby permitting a substantial reduction in intensity of ionization to occur therein before the inverse potential is applied thereto. Such other means may be used in addition to the means hereinabove described or as an alternative thereto. For this purpose, I prefer to provide a saturable reactor 69 which may be similar to saturable reactors 67 and 68. Reactor 69 is interposed in series with tube 15 and with one end thereof connected to the cathode 16 of tube 15 and the other end thereof connected to tap 13. When tube 29 is fired while current is passing through tube 15 the inverse potential tends to extinguish tube 15. However, reactor 69, because of its inductance, causes the current passing through tube 15 to continue to flow in the same direction, the current flow gradually reducing and thus permitting a substantial reduction in the intensity of ionization of said tube before the inverse voltage is applied thereto. It will be seen that reactor 67 which is in series with tube 29 serves a double function; it retards the application of the inverse potential derived from condenser 6 to tube 15, and also causes the current passing through tube 29 to decline gradually before the application of the inverse potential resulting from the firing of tube 45 is applied to tube 29.

From the foregoing description it will be apparent that I have provided means for preventing the deleterious effects resulting from the application of inverse voltage in systems of the type described to gaseous rectifying tubes employed therein.

While I have described in detail a specific embodiment of the present invention, it will be apparent to one versed in the art that many changes may be made without departing from the teachings thereof. For example, only one of the two different means for preventing the deleterious effects may be employed at a time; different firing arrangements for the system described and numerous other systems for supplying current to an impedance may be provided. Various other changes will become apparent from the description herein of an embodiment of my invention. Therefore, it is desired that the appended claims be given a broad interpretation commensurate with the scope of the invention within the art.

What is claimed is:

1. In an electrical system, an impedance, a first circuit for supplying a pulse of current to said impedance, said first circuit including a gaseous rectifying tube adapted to be fired to establish said circuit, a second circuit for supplying a subsequent pulse of current to said impedance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and means for retarding the application of said potential to said tube until the current through said tube has decayed and said tube has become almost completely deionized before a substantial portion of said potential is applied thereto.

2. In an electrical system, an impedance, a first circuit for supplying a pulse of current to said impedance, said first circuit including a gaseous rectifying tube adapted to be fired to establish said circuit, a second circuit for supplying a subsequent pulse of current to said impedance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and means arranged in series in said second circuit for retarding the application of said potential to said tube until the current through said tube has decayed and said tube has become almost completely deionized before a substantial portion of said potential is applied thereto.

3. In an electrical system, an inductance, a first circuit for supplying a pulse of current to said inductance, said first circuit including a gaseous rectifying tube adapted to be fired to establish said circuit, a second circuit for supplying a subsequent pulse of current to said inductance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and means arranged in series in said second circuit for retarding the application of said potential to said tube until the current through said tube has decayed and said tube has become almost completely deionized before a substantial portion of said potential is applied thereto.

4. In an electrical system, a transformer, a first circuit for supplying a pulse of current to said transformer, said first circuit including a gaseous rectifying tube adapted to be fired to establish said circuit, a second circuit for supplying a subsequent pulse of current to said transformer, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and means arranged in said second circuit for retarding the application of said potential to said tube until the current through said tube has decayed and said tube has become almost completely deionized before a substantial portion of said potential is applied thereto.

5. In an electrical system, an impedance, a first circuit for supplying a pulse of current to said impedance, said first circuit including a gaseous rectifying tube adapted to be fired to establish said circuit, a second circuit for supplying a subsequent pulse of current to said impedance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and a saturable reactor arranged in series in said second circuit.

6. In an electrical system, an impedance, a first circuit for supplying a pulse of current to said impedance, said first circuit including a gaseous rectifying tube adapted to be fired to establish said circuit, a second circuit for supplying a subsequent pulse of current to said impedance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and a reactor arranged in series in said second circuit for retarding the application of said potential to said tube until the current through said tube has decayed and said tube has become almost completely deionized before a substantial portion of said potential is applied thereto.

7. In an electrical system, an impedance, a first circuit for supplying a pulse of current to said impedance, said first circuit including a gaseous rectifying tube adapted to be fired to establish said circuit, a second circuit for supplying a subsequent pulse of current to said impedance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and a saturable reactor arranged in series in said second circuit for retarding the application of said potential to said tube so that the current through said tube has decayed and said tube has become almost completely deionized before a substantial portion of said potential is applied thereto, said saturable reactor being adapted to saturate at a current flow substantially less than the maximum current passing through the circuit in which it is arranged.

8. In an electrical system, an impedance, a first circuit for supplying a pulse of current to said impedance, said first circuit including a gaseous rectifying tube adapted to be fired to establish said circuit, a second circuit for supplying a subsequent pulse of current to said impedance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit, the application of said potential tending to instantly stop the flow of current through said tube, and means arranged in said first circuit in series with said tube for causing the reduction of current in said tube to occur gradually, to thereby permit substantial deionization to occur before the application of any substantial portion of said potential to said tube.

9. In an electrical system, an impedance, a first circuit for supplying a pulse of current to said impedance, said first circuit including a gaseous rectifying tube adapted to be fired to establish said circuit, a second circuit for supplying a subsequent pulse of current to said impedance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and a reactor arranged in said first circuit in series with said tube.

10. In an electrical system, an impedance, a first circuit for supplying a pulse of current to said impedance, said first circuit including a gaseous rectifying tube adapted to be fired to establish said circuit, a second circuit for supplying a subsequent pulse of current to said impedance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and a saturable reactor arranged in said first circuit in series with said tube for causing the reduction of current in said tube to occur gradually, to thereby permit substantial deionization to occur before the application of any substantial portion of said potential to said tube, said saturable reactor being adapted to saturate at a current flow substantially less than the maximum current passing through the circuit in which it is arranged.

11. In an electrical system, an impedance, a plurality of condensers adapted to be charged, a first circuit for discharging one of said condensers into said impedance to supply a pulse of current thereto, said first circuit including a gaseous rectifying tube adapted to be fired to establish said circuit, a second circuit for discharging another of said condensers into said impedance to supply a subsequent pulse of current to said impedance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and means arranged in series in said second circuit for retarding the application of said potential to said tube so that the current through said tube has decayed and said tube has become almost completely deionized before a substantial portion of said potential is applied thereto.

12. In an electrical system, an impedance, a plurality of condensers adapted to be charged, a first circuit for discharging one of said condensers into said impedance to supply a pulse of current thereto, said first circuit including a gaseous rectifying tube adapted to be fired to establish said circuit, a second circuit for discharging another of said condensers into said impedance to supply a subsequent pulse of current to said impedance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and means arranged in said first circuit in series with said tube for retarding the application of said potential to said tube so that the current through said tube has decayed and said tube has become almost completely deionized before a substantial portion of said potential is applied thereto.

13. In an electrical system, a transformer, a plurality of condensers adapted to be charged, a first circuit for discharging one of said condensers into said transformer to supply a pulse of current thereto, said first circuit including a gaseous rectifying tube adapted to be fired to establish said circuit, a second circuit for discharging another of said condensers into said transformer to supply a subsequent pulse of current to said transformer, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and a reactor arranged in series in said second circuit.

14. In an electrical system, a transformer, a plurality of condensers adapted to be charged, a first circuit for discharging one of said condensers into said transformer to supply a pulse of current thereto, said first circuit including a gaseous rectifying tube adapted to be fired to establish said circuit, a second circuit for discharging another of said condensers into said transformer to supply a subsequent pulse of current to said transformer, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit and a reactor arranged in said first circuit in series with said tube.

15. In an electrical system, an impedance, a first circuit for supplying a pulse of current to said impedance, said first circuit including a gaseous rectifying tube adapted to be fired to establish said circuit, a second circuit for supplying a subsequent pulse of current to said impedance, means for establishing said second circuit before said first-mentioned pulse has expired and before said tube has become deionized, said second circuit being adapted to apply a potential to said tube, said potential being inverse to the voltage on said tube and substantially greater than the instantaneous voltage on said tube at the moment of the establishment of said second circuit, a reactor arranged in said first circuit in series with said tube, and a reactor arranged in series in said second circuit.

JOHN W. DAWSON.